United States Patent
Singh et al.

(10) Patent No.: US 6,963,745 B2
(45) Date of Patent: Nov. 8, 2005

(54) METHOD FOR PERFORMING INTER SYSTEM HANDOVERS IN MOBILE TELECOMMUNICATION SYSTEM

(75) Inventors: Arnresh Singh, Bangalore (IN); Rajesh Vandanapu, Bangalore (IN); Mohan Rao, Bangalore (IN); Kyu-Hwan Yi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 363 days.

(21) Appl. No.: 10/341,501

(22) Filed: Jan. 13, 2003

(65) Prior Publication Data

US 2003/0139184 A1 Jul. 24, 2003

(30) Foreign Application Priority Data

Jan. 23, 2002 (KR) ........................................ P2002-3840
Nov. 26, 2002 (KR) ................................ 10-2002-0073997

(51) Int. Cl.$^7$ ............................................... H04Q 7/20
(52) U.S. Cl. ...................................... 455/437; 455/436
(58) Field of Search .................................. 455/436, 437

(56) References Cited

U.S. PATENT DOCUMENTS

| | | | | |
|---|---|---|---|---|
| 6,377,804 | B1 * | 4/2002 | Lintulampi | 455/552.1 |
| 6,466,556 | B1 * | 10/2002 | Boudreaux | 455/442 |
| 6,501,953 | B1 * | 12/2002 | Braun et al. | 455/436 |
| 6,549,779 | B1 * | 4/2003 | Muller et al. | 455/439 |
| 6,643,513 | B2 * | 11/2003 | Timonen et al. | 455/436 |
| 6,671,507 | B1 * | 12/2003 | Vinck | 455/436 |
| 6,725,039 | B1 * | 4/2004 | Parmar et al. | 455/436 |
| 6,778,959 | B1 * | 8/2004 | Wu et al. | 704/256 |
| 6,782,274 | B1 * | 8/2004 | Park et al. | 455/552.1 |
| 2003/0114158 | A1 * | 6/2003 | Soderbacka et al. | 455/436 |
| 2003/0119550 | A1 * | 6/2003 | Rinne et al. | 455/553 |
| 2003/0207688 | A1 * | 11/2003 | Nikkelen | 455/436 |
| 2004/0029587 | A1 * | 2/2004 | Hulkkonen et al. | 455/436 |

FOREIGN PATENT DOCUMENTS

WO        WO 2085060 A2 * 10/2002 ............ H04Q/7/38

* cited by examiner

Primary Examiner—W. R. Young
Assistant Examiner—M. Santiago-Cordero
(74) Attorney, Agent, or Firm—Dilworth & Barrese, LLP

(57) ABSTRACT

An inter system handovers in a mobile telecommunication system is performed when a dual mode user equipment (UE) covered by both GSM/GPRS network and UMTS network connects a dedicated channel and sets up a call in a BSS region where the GSM/GPRS provides coverage, and then moves to a UTRAN (UMTS Terrestrial Radio Access Network) where the UMTS provides coverage, wherein the method includes the steps of: if the dual mode UE receives an inter system handover command, i.e. from the BSS to the UTRAN, requesting GSM/GPRS data link layer to suspend a GSM/GPRS data link by a sublayer RR of GSM/GPRS network layer in the UE, requesting a GSM/GPRS physical layer to release a physical channel of the GSM/GPRS, and sending the inter system handover command to the UTRAN for authorizing a sublayer RRC of UMTS network layer in the UE to continue a call; requesting, at the RRC in the UE, a UMTS physical channel to be configured as a UMTS physical channel, and monitoring if the UMTS physical layer succeeds to have the configuration of the UMTS physical channel as requested; if the UMTS physical layer succeeds to have the configuration of the UMTS physical channel, requesting, at the RRC in the UE, a UMTS data link layer to configure a UMTS data link, and conveying information to the UTRAN through a UMTS channel that the handover between systems from the BSS to the UTRAN has been successfully performed; and sending, at the RRC, a GSM/GPRS resource release message to RR/GRR, thereby resetting the GSM/GPRS physical layer and the GSM/GPRS data link layer.

16 Claims, 6 Drawing Sheets

METHOD FOR PERFORMING INTER SYSTEM HANDOVERS IN MOBILE TELECOMMUNICATION SYSTEM

PRIORITY

This application claims priority to an application entitled "Method for performing inter system handovers in mobile telecommunication system" filed in the Korean Industrial Property Office on Jan. 23, 2002 and Nov. 26, 2002, and assigned Serial Nos. 2002-3840 & 2002-73997, respectively, the contents of which are incorporated herein by reference.

BACKGROUND OF THE INVENTION

1. Field of the Invention

The present invention relates generally to a method for performing handovers in mobile telecommunication systems, and more particularly, to a method for performing inter system handovers using different telecommunication methods.

2. Description of the Related Art

GSM (Global System for Mobile communication) is a digital mobile phone system favored in the vast majority of nations in Europe and other areas. The GSM is a variation of TDMA (Time Division Multiple Access), and in fact, it is one of three major digital radio (cordless) phone technologies together with TDMA and CDMA (Code Division Multiple Access), which are currently being used the most. The GSM digitizes and compresses data, and sends the data plus data of another two users to one channel. Here, each data is sent to its own specific time band. Such GSM can be carried out in both 900 MHz and 1800 MHz. GPRS (General Packet Radio Services) is a newly developed packet-based mobile telecommunication services based on the GSM. The GPRS guarantee sustainable data service at the data speed of 56 Kbps to 114 Kbps to mobile station (MS) users. The GPRS is an evolutionary step heading for UMTS (Universal Mobile Telecommunication Service), a third generation mobile telephony system, for providing high-speed, high-quality voice and multimedia services.

Although the UMTS is based on GSM communication standard, it uses wideband CDMA technologies as well. Therefore, the UMTS can provide uniform services, i.e. transmitting packet-based text, digitized voice or video, and multimedia data at a higher data speed than 2 Mbps (mega bit per second) to any cellular phone or computer user no matter which part of the world they are located in. The UMTS is built on the virtual connection, that is, the packet switching system connection using a packet protocol, such as, IP (Internet Protocol), whereby it is connectable to any type of end within the network.

Such UMTS is called a third generation mobile telephone system, which is currently under development as a successor to the GSM/GPRS and other existing digital systems. A problem still arises though because technical transition from the second generation cellular system (i.e. GSM/GPRS) to the third generation mobile telephony system (i.e. UMTS) will take place step by step, probably years, many network operators feel the necessity of providing users with mobile terminals that work in both GSM/GPRS and UMTS modes for the time being. As such, a dual mode user equipment or dual mode mobile terminal (it is interchangeably used with "user equipment") that supports UMTS as well as GSM/GPRS was developed. Further, since many mobile terminal users travel across the nations for business, moving from one region to another region where different radio access technologies are covered via certain nations with certain types of roaming services, there is a necessity for a multi-mode mobile terminal. Therefore, to develop the third generation mobile telephone system, it is absolutely important to develop a dual mode mobile terminal. In this way, even though UMTS is not yet completely developed, mobile subscribers can be provided with multi services by using dual mode mobile terminals that supports both UMTS and GSM/GPRS whenever necessary. Consequently, when they move to a region where there is no coverage provided for UMTS users, the call still can be set up on an existing network, e.g. GSM 900 or GSM 1800.

As discussed before, when a dual mode mobile terminal in a call mode in a region where the GSM/GPRS or UMTS provides coverage moves to another region where another radio access technology (RAT) provides coverage, it should be possible to perform a handover, switching channel to a concerned RAT network while maintaining the existing GSM/GPRS or UMTS connection. However, currently provided technologies are not equipped with this handover capability. Hence, when mobile terminals move between regions where different networks provide coverage, their calls are disconnected, thereby causing much inconvenience to users.

SUMMARY OF THE INVENTION

An object of the invention is to solve at least the above problems and/or disadvantages and to provide at least the advantages described hereinafter. Accordingly, one object of the present invention is to solve the foregoing problems by providing a method for performing inter system handovers with different radio access technologies in mobile telecommunication system without disconnecting a call.

Another object of the present invention is to provide a method for performing handovers between GSM/GPRS and UMTS networks without disconnecting calls.

Another object of the present invention is to provide a method for performing handovers between GSM/GPRS resource layer and UMTS resource layer within a dual mode mobile terminal (or user equipment), thereby performing handovers between different radio access technologies.

Another object of the present invention is to provide a method for performing soft handovers without disconnecting dedicated connection between GSM/GPRS and UMTS networks.

Still another object of the present invention is to provide a method for performing inter system handovers using a dual mode mobile terminal (or user equipment) for a fluent interwork (cooperation) between a protocol stack where GSM/GPRS provides coverage and a protocol stack where UMTS provides coverage.

Yet another object of the present invention to provide a method for performing handovers of circuit switched calls in process, such as, from UMTS to GSM/GPRS or from GSM/GPRS to UMTS, without disconnecting the calls.

To achieve the above objects, there is provided a method for performing inter system handovers in a mobile telecommunication system, wherein a handover process is performed when a dual mode mobile terminal (or dual mode user equipment) covered by both GSM (Global System for Mobile communication)/GPRS (General Packet Radio Service) network and UMTS (Universal Mobile Telecommunications System) network connects a dedicated channel and sets up a call in a BSS (Base Station Subsystem) region where the GSM/GPRS provides coverage, and then moves to a UTRAN (UMTS Terrestrial Radio Access Network) where the UMTS provides coverage, the method including the steps of: if the dual mode user equipment (UE) receives an inter system handover command, i.e. from the BSS to the UTRAN, requesting, at a sublayer RR (Radio Resource) of GSM/GPRS network layer in the UE, a GSM/GPRS data link layer to suspend a GSM/GPRS data link, requesting a GSM/GPRS physical layer to release a physical channel of the GSM/GPRS, and sending the handover command between systems to the UTRAN for thereby authorizing a sublayer RRC (Radio Resource Control) of UMTS network layer in the mobile terminal to continue calls; requesting, at the RRC in the mobile terminal, a UMTS physical channel to have a configuration of the UMTS physical channel, and monitoring if the UMTS physical layer succeeded to have the configuration of the UMTS physical channel as requested; if the UMTS physical layer succeeded to have the configuration of the UMTS physical channel, requesting, at the RRC in the UE, a UMTS data link layer to configure a UMTS data link, and conveying information to the UTRAN through a UMTS channel that the handover between systems from the BSS to the UTRAN has been successfully performed; and sending, at the RRC in the mobile terminal, a GSM/GPRS resource release message to RR/GRR of the UE, thereby resetting the GSM/GPRS physical layer and the GSM/GPRS data link layer to a default level.

Preferably, the present invention described above further comprises a step of: before sending the GSM/GPRS data link suspend request message to the GSM/GPRS data link layer, if the RR/GRR in the mobile terminal fails the handover between systems to the UTRAN, storing a present dedicated channel configuration and parameter assigned to each cell in order to return to a previous dedicated channel configuration.

Another aspect of the present invention provides a method for performing inter system handovers in a mobile telecommunication system, wherein a handover is performed when a dual mode mobile terminal (or dual mode user equipment) covered by both GSM (Global System for Mobile communication)/GPRS (General Packet Radio Service) network and UMTS (Universal Mobile Telecommunications System) network connects a dedicated channel and carries out a communication in a UTRAN (UMTS Terrestrial Radio Access Network) where the UMTS provides coverage, and then moves to a BSS (Base Station Subsystem) region where the GSM/GPRS provides coverage, the method comprising the steps of: if the dual mode user equipment (UE) receives an inter system handover command, i.e. from the UTRAN to the BSS, requesting, at a RRC (Radio Resource Control)/GRR (GPRS-RR) that is a sublayer of UMTS network layer in the UE, a UMTS data link layer to suspend a UMTS data link, requesting a UMTS physical layer to release a physical channel of the UMTS, and sending the handover command between systems from the UTRAN for thereby authorizing a sublayer RR (Radio Resource) of GSM/GPRS network layer in the UE to continue calls; requesting, at the RR/GRR in the UE, a GSM/GPRS physical channel to have a GSM/GPRS physical channel configuration, and monitoring if the GSM/GPRS physical layer succeeded to have the configuration of the GSM/GPRS physical channel as requested; and if the GSM/GPRS physical layer succeeded to have the configuration of the GSM/GPRS physical channel, requesting, at the RR/GRR in the UE, a GSM/GPRS data link layer to configure a GSM/GPRS data link, and conveying information to the BSS through a GSM/GPRS channel that the handover between systems from the UTRAN to the BSS has been successfully performed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For the purpose of clarity and simplicity, well-known functions or constructions are not described in detail as they would obscure the invention in unnecessary detail.

RAT (Radio Access Technology) in a mobile telecommunication system refers to CDMA, TDMA or WCDMA, and inter-RAT handovers refer to handovers between radio access technologies. Therefore, handovers between GSM/GPRS (of the second generation) and UTRAN (of the third generation) correspond to the inter-RAT handovers.

Inter-RAT handover is a hard handover based on break and make strategy. According to the hard handover based on break and make strategy, a dedicated connection is first disconnected, and then a new dedicated connection is designated on a different frequency or RAT network. This method is based on an assumption that 'break' always occurs between hard handovers. Fortunately, the break is short, in fact, too short for users to even realize. Hard handovers are largely divided into two types: intra-RAT handovers (e.g. GSM handovers) and inter-RAT handovers (e.g. handovers between GSM and UMTS).

There is another kind of handovers, namely soft handovers. Similar to hard handovers, soft handovers are based on the make before break strategy but applicable to WCDMA UMTS radio technologies wherein more than uplinks are formed a certain node. Soft handovers, unlike hard handovers, do not disconnect dedicated connections.

Taking advantage of the foregoing advantage, the present invention enables a dual mode mobile terminal to perform a soft handover between RATs, that is, intra-RAT soft handover, for preventing any interruption in dedicated connections.

Figure 1:
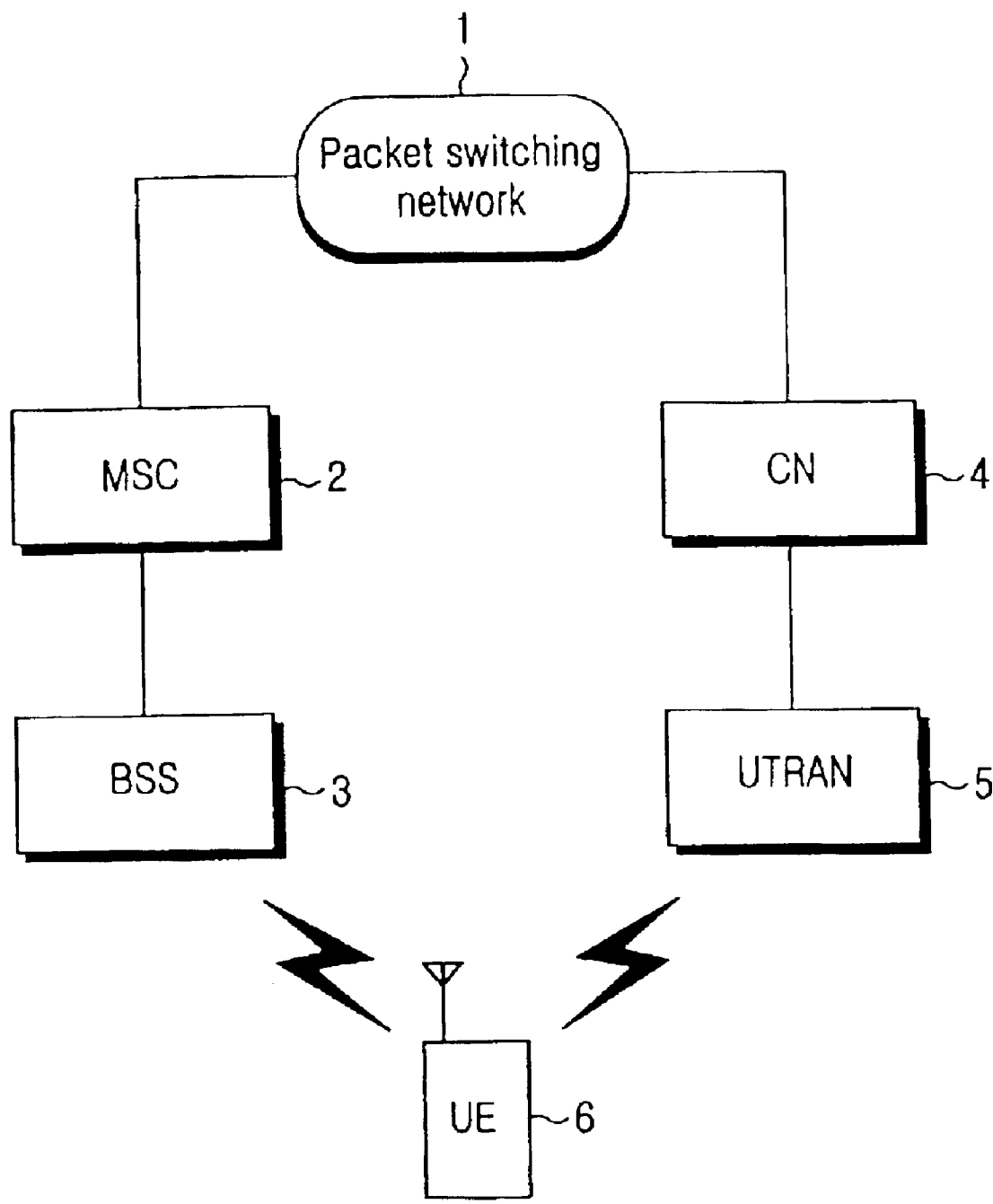
FIG. 1 depicts a configuration of a mobile telecommunication system that supports GSM TDMA (of the second generation) and UMTS W-CDMA (of the third generation) based on a packet switching network.

FIG. 1 is a schematic diagram of a mobile telecommunication system that supports GSM TDMA (of the second generation) and UMTS W-CDMA (of the third generation), having the basis on packet switching network. Referring to FIG. 1, BSS (Base Station Subsystem) 3 is connected to packet switching network 1 like Internet through MSC (Mobile Switching Center) 2, and provides voice and data services using an adaptive communication protocol based on GSM TDMA. In addition, UTRAN (UMTS Terrestrial Radio Access Network) 5 is connected to the packet switching network 1 through CN (Core Network) 4, and provides voice and data services using an adaptive communication protocol based on UMTS W-CDMA. On the other hand, a dual mode mobile terminal (hereinafter it is referred to as "User Equipment" or "UE") 6 supporting both UMTS and GSM/GPRS sets up calls by using an adaptive communication protocol on GSM/GPRS in a region where BSS provides coverage, and an adaptive communication protocol on UMTS in a region where UTRAN 5 provides coverage.

Figure 2:
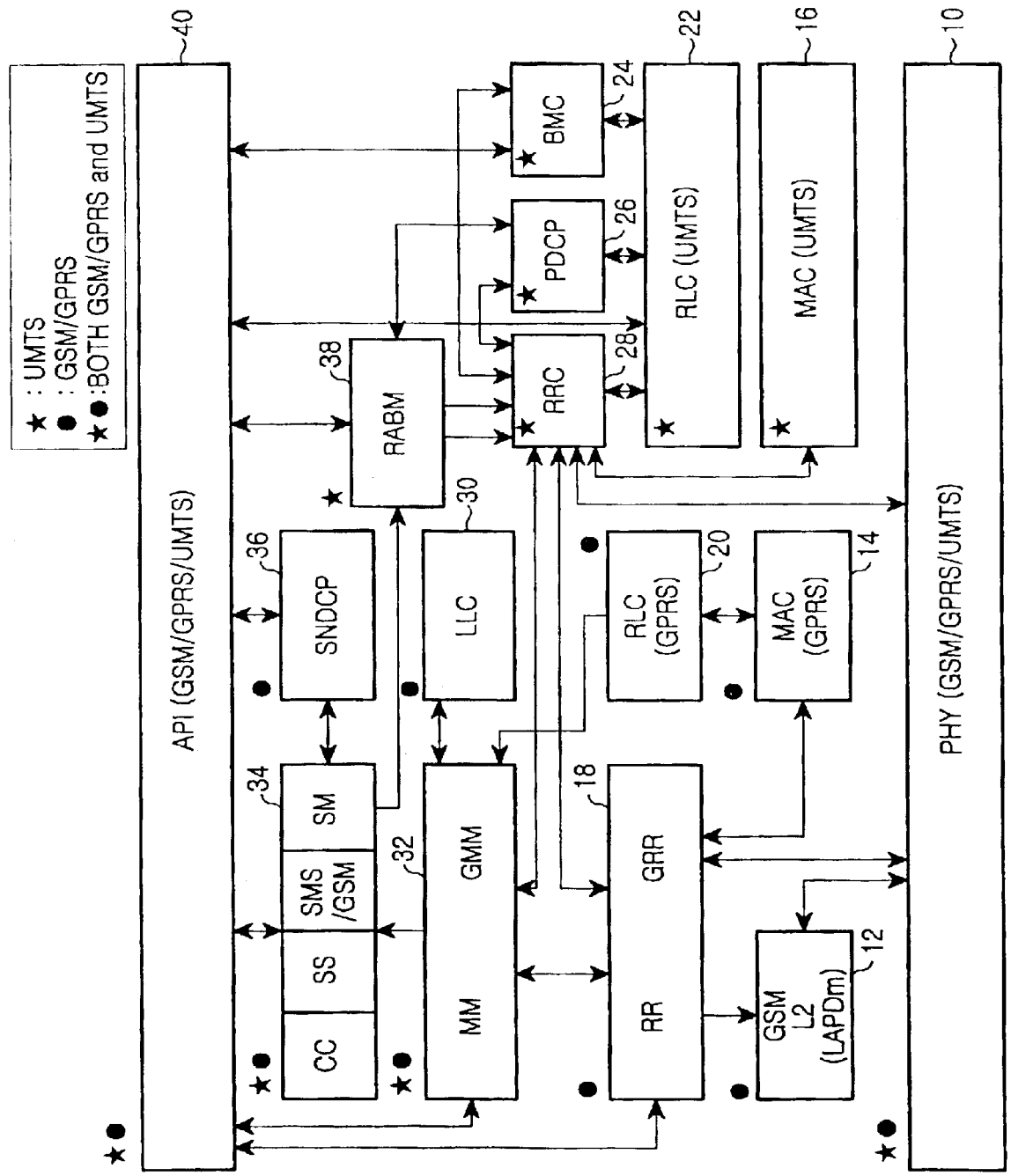
FIG. 2 is a diagram illustrating an interface between a protocol stack and a layer of a dual mode user equipment (mobile terminal) to which the present invention is applied.

In order to perform inter-RAT handovers between GSM/GPRS TDMA system and UMTS W-CDMA system, the dual mode user equipment 6 supporting both GSM/GPRS TDMA and UMTS W-CDMA has a logical channel responsive to a communication protocol based on GSM/GPRS and UMTS, respectively, a network layer ($3^{rd}$ layer) for controlling radio resources, and a data link layer ($2^{nd}$ layer). The network and data link layers share upper layer (higher than $_4$th layer), conforming to OSI (Open Systems Interconnection) model, and physical layer FIG. 2 illustrates an interface between a protocol stack and layer of the dual mode user equipment to which the present invention is applied. In FIG. 2, "★" marked blocks indicate modules for UMTS only, and "•" marked blocks indicate modules for GSM/GPRS only. "★•" marked blocks indicates shared modules for both GSM/GPRS and UMTS. More specifically, the shared modules for GSM/GPRS and UMTS that are marked by "★•" include PHY (physical layer) 10, MM/GMM (Mobility Management/GPRS-MM) 32, CC/SS/SMS/SM (Call Control/Supplementary Services/Short Message Service/Session Management) 34, and API (Application Protocol Interface) 40. The modules exclusively for UMTS network marked by "★" include MAC (Medium Access Control) 16, RLC (Radio Link Control) 22, RRC (Radio Resource Control) 28, PDCP (Packet Data Convergence Protocol) 26, BMC (Broadcast Multicast Control) 24, and RABM (Radio Access Bearer Management) 38. The modules exclusively for GSM/GPRS network marked by "•" include LAPDm (Link Access Procedures for Data Link Layer for mobile applications) 12, MAC (Medium Access Control for GPRS) 14, RR/GRR (Radio Resource/GPRS Radio Resource) 18, RLC (Radio Link Control for GPRS) 20, LLC (Logical Link Control) 30, and SNDCP (Sub-Network Dependent Convergence Protocol) 36.

In a protocol stack of the dual mode user equipment 6 shown in FIG. 2, PHY (physical layer) 10 belongs to the first layer. The first layer is responsible for transceiving packets. Before getting into further details on the procedure of inter-synchronism (i.e. inter-RAT soft handover), it will be helpful to go over a general handover first.

Every step involved with the general handover is carried out in the dual mode user equipment 6 and BSS 3/UTRAN 5 and MSC 2/CN 4. The user equipment 6 continuously measures performances of radio subsystem downlink and signal levels that are sent from other neighboring (or adjacent) cells. Most of time, the third generation (UMTS) cells can be included in the adjacent cells.

The dual mode user equipment 6 in GSM mode monitors the level and quality of downlink received signals from a service providing cell to itself, and it also monitors the level of downlink received signal of an adjacent BSIC (Base Station Identity Code). In addition, the dual mode UE 6 carries out similar measurement on other adjacent UMTS cells. The dual mode user equipment 6 then writes a measurement report based on the data collected from monitoring, and transfers the report to BSS 3. The measurement report is prepared periodically or at the request of a special event. BSS 3, on the other hand, monitors uplink received signal level and quality, the signal having been received from an individual user equipment being provided services of a relevant cell, and measures interference level against its idle traffic channels. Moreover, BSS 3 makes initial evaluations on the measurements responsive to a preset critical value and then performs a handover. In general, MSC 2 makes evaluations on the handover requiring the measurement result obtained from information in other BSS or MSC. A handover selected by networks for wireless link control may or may not be performed, depending on measurement result reported by the user equipment 6/BSS 3 and a variety of parameters that have been preset in every cell.

It is necessary to perform a handover, namely inter-RAT handover, when the dual mode user equipment 6 supporting both UMTS and GSM radio access technologies travels from a region where the GSM provides coverage to another region where the UMTS network provides coverage, and vice versa. In case UMTS RAT is currently in an active mode, the handover command is transmitted from UTRAN 5, while in case GSM RAT is currently in an active mode, the handover command is transmitted from BSS 3.

Responsive to channel configuration information given to the handover command, the dual mode user equipment 6 takes the following actions:

Suspend normal (or ordinary) actions except for radio resource management (the $3^{rd}$ layer).

Disconnect major signaling link to other links through a local end release (the $2^{nd}$ layer), and disconnect, if there are, any existing traffic (dedicated) channel connections.

Form an UMTS channel in the case of performing an inter-RAT handover to a UTRAN, and form a GSM channel in the case of performing an inter-RAT handover from a UTRAN. Meanwhile, handovers to UMTS or GSM/GPRS coverage are always initiated by a network.

Referring now to FIGS. 3 and 4, described below are the steps involved in the handover procedure from a GSM/GPRS ($2^{nd}$ generation) to a UTRAN ($3^{rd}$ generation), so called "2G to 3G handover", and the handover procedure from a UTRAN ($3^{rd}$ generation) to a GSM/GPRS ($2^{nd}$ generation). It should be noted that in the following discussion, the GSM would represent the second generation GSM and GPRS networks. It will be needless to mention that the GPRS can be applied to the both handovers.

Figure 3A:
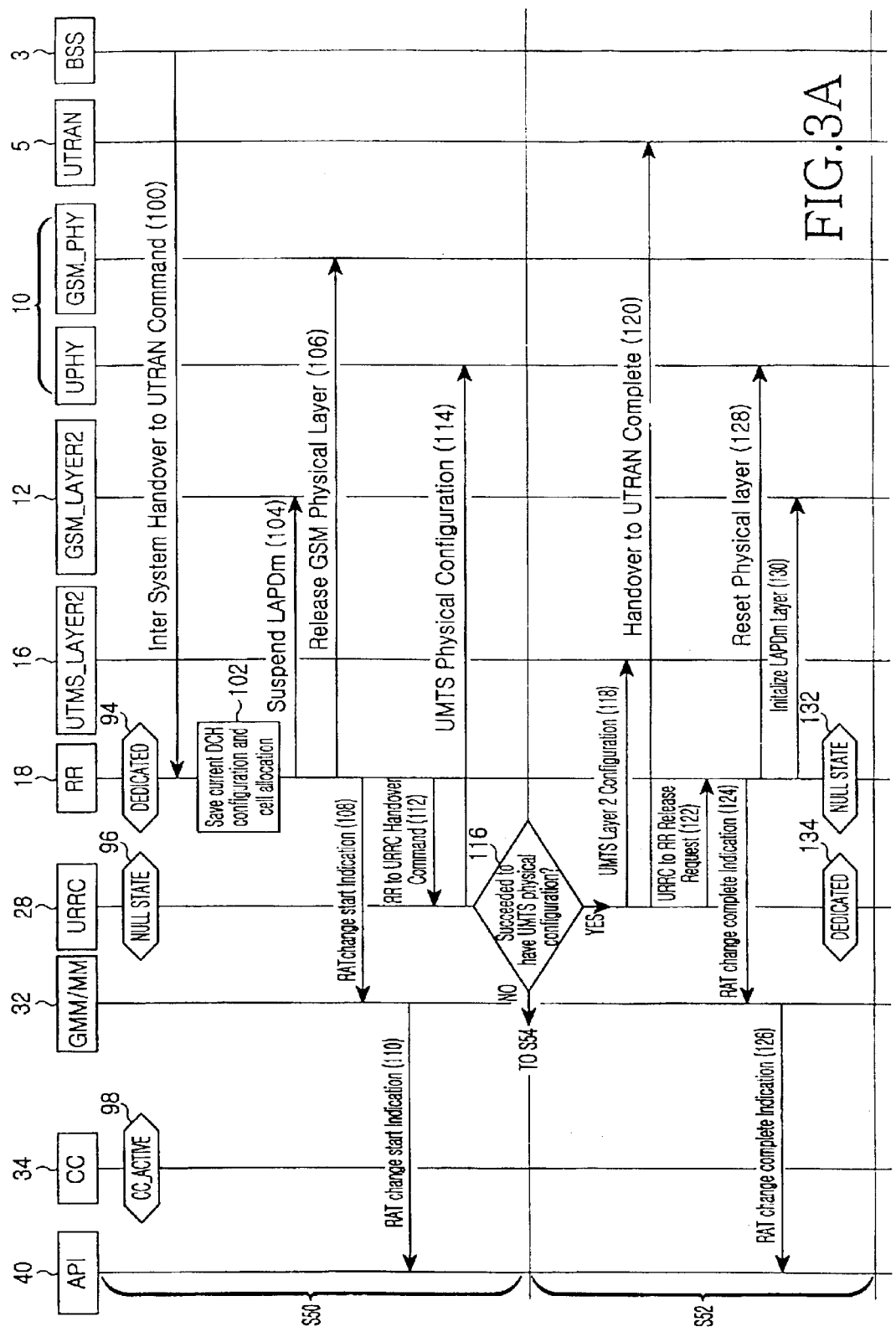
FIGS. 3A and 3B are a message flow chart representing a procedure for performing an inter-RAT handover from GSM/GPRS BSS to UMTS UTRAN in accordance with a first preferred embodiment of the present invention.
Figure 3B:
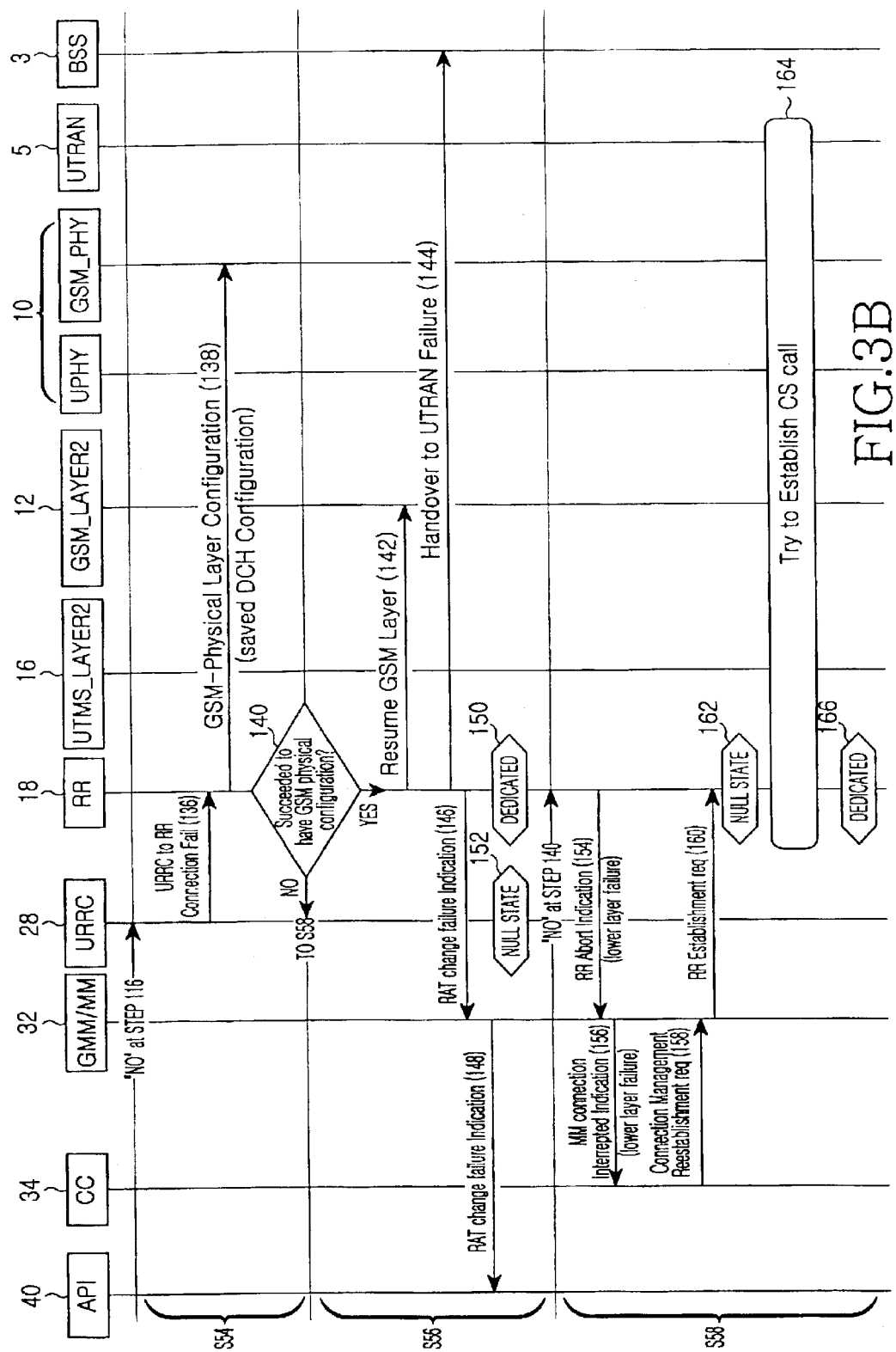

First of all, the handover procedure from a GSM ($2^{nd}$ generation) to a UTRAN ($3^{rd}$ generation) is explained with reference to FIG. 1 through FIGS. 3a and 3b. Turning now to FIGS. 3a and 3b, message flow charts illustrate the inter-RAT handover procedure from a GSM BSS to a UMTS UTRAN in accordance with the present invention.

1. Handover from a GSM to a UMTS

A primary object of the inter-RAT handover, that is, between RAN types, from GSM to UTRAN 5 is to transfer an existing dedicated connection between a UE 6 and BSS 3 to a UMTS under the network control while maintaining the connection. This proceeds when BSS 3 commands UE 6 to perform a handover to UTRAN 5. The procedure applies to a single circuit call service.

Referring now FIGS. 3a and 3b, the handover procedure to a UMTS is largely divided into five steps, e.g. S50, S52, S54, S56, and S58.

First, a general explanation of FIGS. 3A and 3B will be given, followed by a more detailed explanation below. At step 50 (S50), an inter-RAT handover command from BSS to UTRAN is transmitted to a dual mode UE. Then, a RR (Radio Resource) that is a sublayer of GSM network layer in the UE requests a GSM data link layer to suspend the GSM data link and a GSM physical layer to release the GSM physical channel, and sends the inter-RAT handover command to the UTRAN for authorizing or giving control over the handover to a RRC (Radio Resource Control) that is a sublayer of UMTS network layer in the UE, and the RRC requests a UMTS physical layer to have a UMTS physical channel configuration and monitors if the UMTS physical channel succeeded to have the UMTS physical layer configuration as requested.

Step 52 (S52) proceeds as the UMTS physical channel succeeds to have the UMTS physical layer configuration at step 50. In this step, the RRC in the UE requests a UMTS data link layer to have a UMTS data link configuration, and transmits information that the inter-RAT handover to the UTRAN has been successfully completed to the UTRAN through a UMTS channel, and the RRC requests the RR in the UE to release GSM resource for thereby resetting the GSM physical layer and the GSM data link layer.

Step 54 (S54) proceeds if the UMTS physical channel did not succeed to have the UMTS physical layer configuration at step 50. In this step, the UMTS RRC informs to the GSM RR in the UE that the handover to the UTRAN is impossible, and based on a dedicated channel configuration and parameters assigned to each cell by the RR, tries to restore the GSM physical layers, and then determines if the GSM physical layer configuration has been properly restored.

Step 56 (S56) proceeds as the GSM physical layer configuration is successfully restored at step 54. In this step, the RR in the UE requests to resume the GSM data link that had been held by the GSM data link layer, and transmits information to the BSS through a previous GSM channel that the inter-RAT handover to the UTRAN has failed.

Step 58 (S58) proceeds if restoration of the GSM physical layer configuration failed. In this step, the RR informs to a CC (Call Control) through a MM (Mobility Management) of a network layer in the UE that a lower layer connection among the dedicated connection has failed, and tries to set up a call from an idle state at a call resetting request of the CC, thereby maintaining the dedicated connection.

Referring now to FIG. 3a, step 50 is first expounded. GSM RR 18 of UE 6 in the GSM mode before receiving the handover command is in a dedicated state (S94). UMTS RRC 28 is in a null state (S96). CC 34 responsible for controlling in connection with calls of UE is in an active state (S98).

When the dual mode UE 6 moves from GSM coverage to UMTS coverage in those states, a measurement report from UE 6 is sent to BSS 3 periodically or on a special event. Then BSS 3 evaluates the reported measurements according to a prefixed critical value, and sublayer RR of GSM/GPRS BSS 3 sends "Inter System Handover to UTRAN Command" message to GSM RR 18 of UE 6 (S100). The "Inter System Handover to UTRAN Command" message includes description on the handover command to UMTS.

When UE 6 receives the "Inter System Handover to UTRAN Command" message, GSM RR 18 stores a current dedicated channel (DCH) configuration and cell allocation parameters to return to a previous DCH in case the handover procedure to UTRAN 5 fails (S102). Moreover, GSM RR 18 of UE 6 transmits "Suspend LAPDm" message to LAPDm 12 (S104). The "Suspend LAPDm" message is sent to a locally suspended layer 2 dedicated link. Also, GSM RR 18 transmits "Release GSM physical Channel" message to GSM physical channel (GSM_PHY) of GSM RR 18 PHY 10 in UE 6, requesting GSM relevant physical resources (S106). As such, GSM PHY (GSM_PHY) of PHY 10 releases all of the GSM physical channels both in the uplink and downlink.

Following step 106, GSM RR 18 sends "RAT Change start Indication" message to MM 32 (S108). After receiving the "RAT Change start Indication" message, MM 32 transmits the received message to an application layer API 40 (S110). MM 32 buffers every layer 3 message of the upper layer until RAT change is completed. Accordingly, once API 40 receives the "RAT change start Indication" message from MM 32, it suspends voice application and buffers every voice packet instead until "RAT Change Failure Indication" message or "RAT Change Completion Indication" message arrives.

In the meantime, GSM RR 18 of UE 6 sends "RR to RRC Handover Command" message included in the "Inter System Handover to UTRAN Command" message to UMTS RRC 28 (S112). After receiving the "RR to RRC Handover Command" message from GSM RR 18, UMTS RRC 28 in UE 6 should send a message for activating UMTS physical layer since UMTS network instead of GSM network should provide coverage now. For instance, UMTS RRC 28 sends "UMTS_Phy Configuration" message together with physical channel configuration parameter included in the "RR To RRC Handover Command" message to PHY 10 (S114). It is done so as to command UMTS physical channel (UPHY) of PHY 10 to configure a UMTS relevant physical channel. UPHY of PHY 10, responsive to "UMTS_Phy Configuration" message, takes proper actions like preparing for adequate network and synchronism to thus receive a message from UMTS network. Afterward, UPHY sends "UMTS_Phy Configuration Confirm" message (not shown) to UMTS RRC 28 in UE 6, notifying that it is really ready to work.

If UMTS relevant physical layer configuration is successfully done (This is found out at step 116 of FIG. 3a.), in other words, if UMTS RRC 28 in UE 6 receives "UMTS_Phy Configuration Confirm" message from UPHY, step 52 covering S118 through S134 is carried out. However, if UMTS relevant physical layer configuration fails (This is also found out at step 116 of FIG. 3a.), step 54 covering S136 through S140 proceeds.

First, step 52 (from S118 through S134 of FIG. 3a) that is performed as UMTS relevant physical layer configuration succeeds is discussed below.

At step 52, UMTS RRC 28 in UE 6 sends "UMTS-L2 Configuration" message to UMTS MAC 16, whereby UMTS MAC 16 has a configuration of UMTS layer 2 (S118). Later UMTS RRC 28 sends "Handover To UTRAN Complete" message to UTRAN 5 through UMTS channels to inform that inter system handover to a UTRAN has been successfully completed (S120). This means that a user can set up a call in a region where UMTS network provides coverage. As such, UMTS RRC 28 in UE sends "RRC To RR Release Request" message to GSM RR 18, requesting GSM RR 18 to release all GSM resources (S122).

Responsive to the message received, GSM RR 18 sends "RAT Change complete Indication" message to MM 32 (S124). Then, MM 32 changes a current RAT environment to UMTS, and sends the "RAT Change complete Indication" message to API 40 (S126). Afterward, MM 32 sends all layer 3 messages through UMTS access stratum layer. After receiving the "RAT Change complete Indication" message from MM 32, API 40 changes a current RAT environment to UMTS, resumes application, and transmits, through a UMTS stack, every voice packet that has been buffered.

On the other hand, GSM RR 18 recognizes that it has done all its part, and sends "Reset GSM Physical Layer" message to GSM physical layer (GSM_PHY) of PHY 10 for resetting a GSM physical layer default configuration (S128). In addition, GSM RR 18 sends "Initialize LAPDm Layer" message to a second layer LAPDm layer 12 for resetting a data link layer to a default configuration (S130). As a result, GSM RR 18 of UE becomes a null state (S132), and UMTS RRC 28 becomes a dedicated state (S134).

Referring now to FIG. 3b, step 54 (step 136 through step 140 of FIG. 3b) that proceeds after a failure of UMTS physical layer configuration at step 50 is discussed below.

At step 54, UMTS RRC 28 sends "RRC To RR Connection Failure" message to GSM RR 18 to inform that the inter system handover to a UTRAN is impossible (S136). The "RRC To RR Connection Failure" message contains the cause of connection failure. GSM RR 18 then sends "GSM-Physical Layer Configuration" message to GSM physical layer (GSM_PHY) of PHY 10 (S138) for thereby restoring GSM relevant physical layers based on previously stored parameters at sub-step 102 of S50. If GSM_PHY of PHY 10 restores in step 140 GSM physical layer configuration in response to the message "GSM-Physical Layer Configuration", "GSM_Phy Configuration Confirm" message (not shown) is forwarded to GSM RR 18 in UE 6. If not, "GSM_Phy Configuration Confirm" message will not be sent to GSM RR 18.

In consequence, if GSM RR 18 succeeds to restore GSM relevant physical layers (i.e. if GSM RR succeeds to set GSM physical channels), S56 covering steps 142 through 152 of FIG. 3b proceeds. However, if GSM RR 18 has not succeeded to restore GSM relevant physical layers, S58 covering steps 154 through 166 of FIG. 3b proceeds.

To explain S56 including steps 142 through 152 of FIG. 3b first, assuming that GSM RR 18 succeeded to restore GSM relevant physical layers, GSM RR 18 sends "Resume GSM layer 2" message to GSM layer 2, namely LAPDm 12 to resume GSM layer 2 that have been suspended (S142), and sends "Handover to UTRAN Failure" message to BSS 3 through a previous GSM channel for indicating that inter-RAT handover has been failed (S144). Further, GSM RR 18 sends "RAT Change Failure Indication" message to MM 32 (S146), and MM 32 forwards the "RAT Change Failure Indication" message to API 40 (S148). From that time, MM 32 continuously gets services from RR 18. Once API 40 receives the "RAT Change Failure Indication" message, it transmits every buffered packet through a GSM stack. As a result, GSM RR 18 of UE goes back to a dedicated state (S150) while UMTS RRC 28 becomes a null state (S152).

Referring again to FIG. 3b, S58 that proceeds if GSM RR 18 fails to restore GSM relevant physical layers at step 140 of S54 is now explained as follows. At S58, RR 18 sends "RR Abort Indication" message to MM 32 to indicate that a lower layer aborted (S154). MM 32 then sends "MM Connection Interrupted Indication" message to CC (Connection Management layer) 34 for informing about the failure in lower layer of dedicated connection (S156). CC 34 in an active state receives the "MM Connection Interrupted Indication" message, and sends "re-establishment request" message to MM 32 (S158). MM 32 sends "RR establishment request" message to RR 18, whereby GSM RR 18 can reestablish a call (S160). As such, GSM RR 18 in an idle state (S162) resets up a call (S164). In this way, GSM RR 18 of UE becomes a dedicated state again (S166).

Turning now to FIG. 4, the present invention provides an inter system handover procedure from UMTS UTRAN 5 to GSM BSS 3. FIG. 4 is a message flow chart representing a procedure for performing an inter system handover from UMTS UTRAN to GSM/GPRS BSS in accordance with a second preferred embodiment of the present invention.

2. Handover from a UMTS to a GSM/GPRS

A primary object of the inter system handover to BSS 3 is to transfer an existing dedicated connection between a UE 6 and UTRAN 5 to a GSM under the network control while maintaining the connection. This proceeds when UTRAN 5 that has occupied a dedicated channel (DCH) commands UE 6 to perform a handover to BSS 3.

The inter system handover (or Inter-RAT) handover procedure from UMTS UTRAN 5 to GSM/GPRS BSS 3 is explained with reference to FIGS. 4a and 4b. The same configuration illustrated in FIG. 1 and FIG. 2 will be applied here also.

Figure 4A:
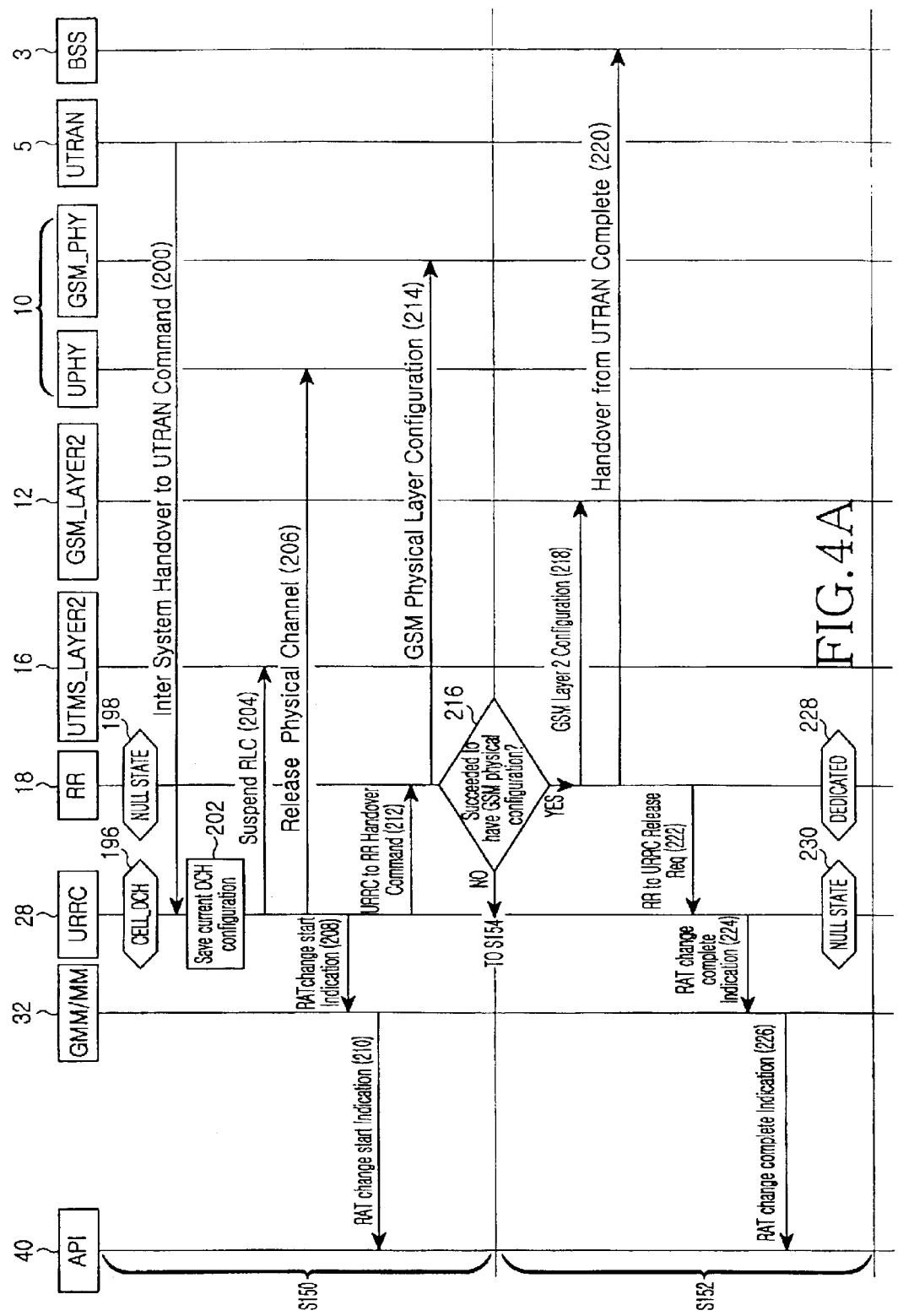
FIGS. 4A and 4B are a message flow chart representing a procedure for performing an inter system handover from UMTS UTRAN to GSM/GPRS BSS in accordance with a second preferred embodiment of the present invention
Figure 4B:
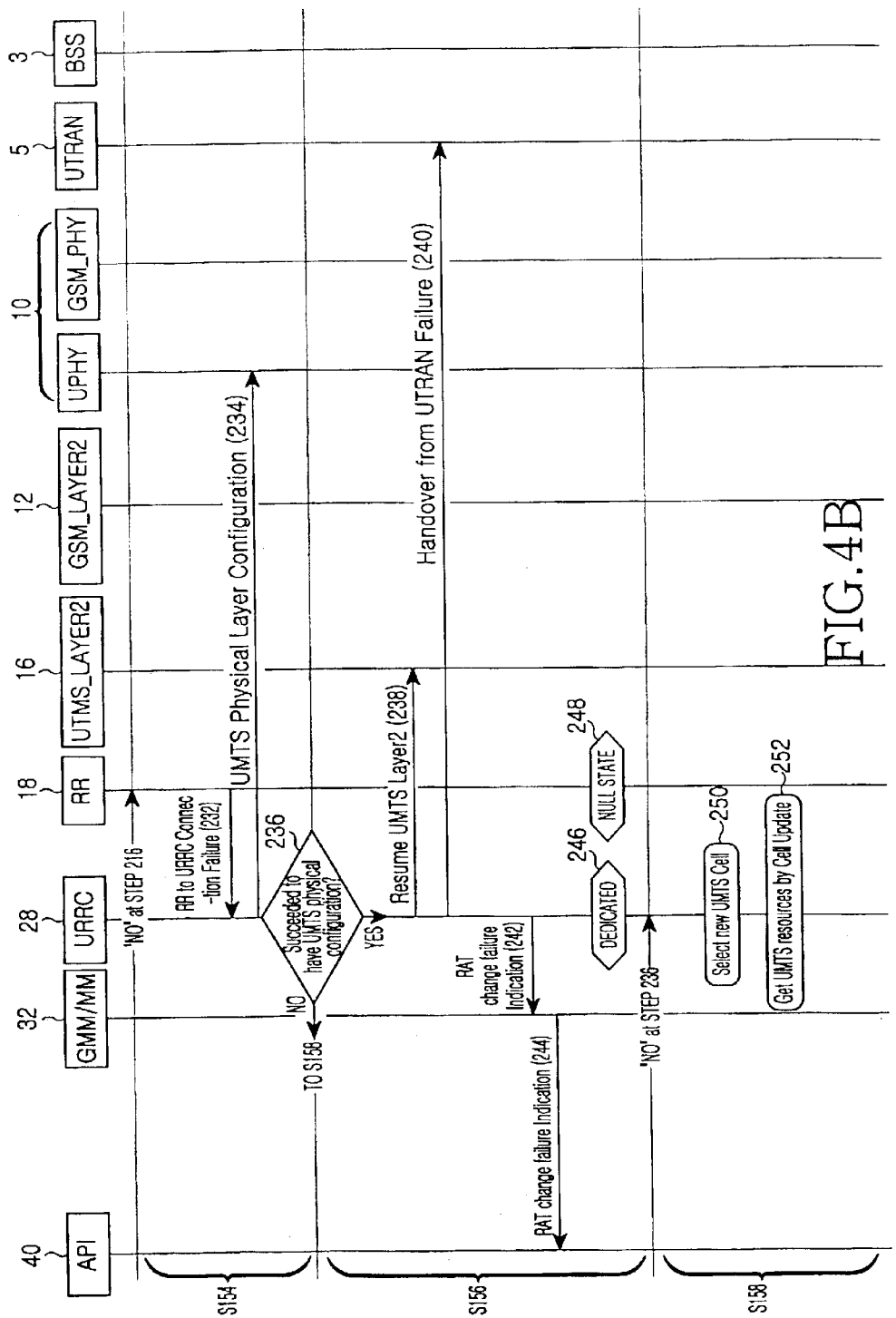

Referring now FIGS. 4a and 4b, a general overview of the handover procedure from a UMTS is largely divided into five steps, e.g. S150, S152, S154, S156, and S158.

At step 150 (S150), an inter-RAT handover command from UTRAN to BSS is transmitted to a dual mode UE. Then, a RRC (Radio Resource Control) that is a sublayer of UMTS network layer in the UE requests a UMTS data link layer to suspend the UMTS data link and a UMTS physical layer to release the UMTS physical channel, and sends the inter-RAT handover command from the UTRAN for authorizing or giving control over the handover to a RR (Radio Resource) that is a sublayer of GSM network layer in the UE, and the RR requests a GSM physical layer to have a GSM physical channel configuration and monitors if the GSM physical channel succeeded to have the GSM physical layer configuration as requested.

Step 152 (S152) proceeds as the GSM/GPRS physical channel succeeds to have the GSM/GPRS physical layer configuration at step 150. In this step, the RR in the UE requests a GSM data link layer to have a GSM data link configuration, and transmits information that the inter-RAT handover from the UTRAN has been successfully completed to the BSS through a GSM channel.

Step 154 (S154) proceeds if the GSM/GPRS physical channel did not succeed to have the GSM/GPRS physical layer configuration at step 150. In this step, the GSM RR informs to the UMTS RRC in the UE that the handover from the UTRAN is impossible, and based on a dedicated channel configuration and cell allocation parameters by the RRC, tries to restore the UMTS physical layers, and then determines if the UMTS physical layer configuration has been properly restored.

Step 156 (S156) proceeds as the UMTS physical layer configuration is successfully restored at step 154. In this step, the RRC in the UE requests to resume the UMTS data link that had been suspended by the UMTS data link layer, and transmits information to the UTRAN through a previous UMTS channel that the inter-RAT handover from the UTRAN has failed.

Step 158 proceeds if restoration of the UMTS physical layer configuration is failed. In this step, the RRC selects a new UMTS cell again, and sends cell update message to the network for getting necessary resources for a call.

A more specific explanation of FIGS. 4A and 4B will now be provided. Referring now to FIG. 4a, step 150 is first expounded. UMTS RRC 28 of UE 6 in the UMTS mode before receiving the handover command is in a dedicated state (S196), and GSM RR 18 is in a null state (S198).

When the dual mode UE 6 moves from UMTS coverage to GSM coverage under those conditions, a measurement report from UE 6 is sent to UTRAN 5 periodically or on a special event. Then UTRAN 5 evaluates the reported measurements according to a prefixed critical value, and sub-layer RRC of UTRAN 5 sends "Inter System Handover from UTRAN Command" message to UMTS RRC 28 of UE 6 (S200). The "Inter System Handover from UTRAN Command" message includes description on the handover command to GSM.

When UMTS RRC 28 of UE 6 receives the "Inter System Handover from UTRAN Command" message, UMTS RRC 28 stores a current UMTS DCH (dedicated channel) configuration and cell allocation parameters to return to a previous DCH in case the handover procedure to GSM fails (S202). Moreover, UMTS RRC 28 of UE 6 transmits "Suspend RLC" message to UMTS MAC 16 which is layer 2 (S204). The "Suspend RLC" message is sent to a suspended layer 2. Also, UMTS RRC 28 of UE 6 transmits "Release Physical Channel" message to UMTS physical channel (UPHY) of PHY 10 in UE 6, requesting to release UMTS relevant physical resources (S206). As such, UPHY of PHY 10 releases all of the UMTS physical channels both in the uplink and downlink.

Following step 206 of FIG. 4*a*, UMTS RRC 28 sends "RAT Change start Indication" message to MM 32 (S208). After receiving the "RAT Change start Indication" message, MM 32 transmits the received message to an application layer API 40 (S210). MM 32 forwards every layer 3 message of the upper layer to API 40 until RAT change is completed. Accordingly, once API 40 receives the "RAT change start Indication" message from MM 32, it suspends voice application and buffers every voice packet instead until "RAT Change Failure Indication" message or "RAT Change Completion Indication" message arrives.

In the meantime, UMTS RRC 28 of UE 6 sends "URRC to RR Handover Command" message included in the "Inter System Handover from UTRAN Command" message to GSM RR 18 (S212). After receiving the "URRC to RR Handover Command" message from UMTS RRC 28, GSM RR 18 in UE 6 should send a message for activating GSM physical layer since GSM network instead of UMTS network provides coverage now. For instance, GSM RR 18 sends "GSM Physical Layer Configuration" message including physical channel configuration parameter included in the "URRC to RR Handover Command" message to GSM_PHY of PHY 10 (S214). It is done so as to command GSM physical channel (GSM_PHY) of PHY 10 to configure a GSM relevant physical channel. GSM_PHY of PHY 10, responsive to "GSM Physical Layer Configuration" message, takes proper actions like preparing for adequate network and synchronization to thus receive a message from GSM network. Afterward, GSM_PHY sends "GSM Physical Layer Configuration Confirm" message (not shown) to GSM RR 18 in UE 6, notifying that it is ready to work.

If GSM relevant physical layer configuration is successfully done (This is determined at step 216 of FIG. 4*a*.), in other words, if GSM RR 18 in UE 6 receives "GSM Physical Layer Configuration Confirm" message from GSM_PHY, step 152 (S152) covering S218 through S230 is carried out. However, if GSM relevant physical layer configuration fails (This is also determined at step 216 of FIG. 4*a*.), step 154 (S154) covering S232 through S234 proceeds.

First, S152 (from S218 through S230 of FIG. 4*a*) that is performed as GSM relevant physical layer configuration succeeds is discussed below.

At S152, GSM RR 18 in UE 6 sends "GSM Layer2 Configuration" message to GSM layer 2, namely LAPDm 12 (S218), whereby LAPDm12 has a configuration of GSM layer 2. Later GSM RR 18 sends "Handover From UTRAN Complete" message to BSS 3 through GSM channels to inform that inter system handover from a UTRAN has been successfully completed (S220). This means that a user can set up a call in a region where GSM network provides coverage. As such, GSM RR 18 in UE sends "RR To URRC Release Request" message to UMTS RRC 28, requesting UMTS RRC 28 to release all UMTS resources (S222).

Responsive to the message received, UMTS RRC 28 sends "RAT Change complete Indication" message to MM 32 (S224). Then, MM 32 changes a current RAT environment to GSM, and sends the "RAT Change complete Indication" message to API 40 (S226). Afterward, MM 32 performs communications with network through GSM access layer (UMTS access stratum layer). After receiving the "RAT Change complete Indication" message from MM 32, API 40 changes a current RAT environment to GSM, resumes application, and transmits, through a GSM stack, every voice packet that has been buffered. As a result, UMTS RRC 28 of UE becomes a null state (S230), and GSM RR 18 becomes a dedicated state (S228).

Turning now to FIG. 4*b*, S150 (covering step 232 through step 236 of FIG. 4*b*) that proceeds after the failure of GSM physical layer configuration at step 216 of S150 is discussed as below.

At S154, GSM RR 18 sends "RR To RRC Connection Failure" message to UMTS RRC 28 to inform that the inter system handover from a UTRAN is impossible (S232). The "RR To RRC Connection Failure" message contains the cause of connection failure. UMTS RRC 28 then sends "UMTS Physical Layer Configuration" message to UMTS physical layer (UPHY) of PHY 10 (S234) for thereby restoring UMTS relevant physical layers based on previously stored parameters at step 202 of S150. In step 236 if UPHY of PHY 10 configures UMTS physical layer configuration responsive to the message "UMTS Physical Layer Configuration", "UMTS Physical Layer Configuration Confirm" message (not shown) is forwarded to UMTS RRC 28 in UE 6. If not, "UMTS Physical Layer Configuration Confirm" message will not be sent to UMTS RRC 28.

In consequence, if UMTS RRC 28 succeeds to restore UMTS relevant physical layers (i.e. if UMTS RRC succeeds to set UMTC physical channels), S156 covering steps 238 through 248 of FIG. 4*b* proceeds. However, if UMTS RRC 28 has not succeeded to restore UMTS relevant physical layers, S158 covering steps 250 through 252 of FIG. 4*b* proceeds.

To explain S156 including steps 238 through 248 of FIG. 4*b* first, assuming that UMTS RRC 28 succeeded to restore UMTS relevant physical layers, UMTS RRC 28 sends "Resume UMTS layer 2" message to UMTS layer 2, namely MAC 16 to resume UMTS layer 2 that have been suspended (S238), and sends "Handover from UTRAN Failure" message to UTRAN 5 through a previous UMTS channel for indicating that inter-RAT handover has been failed (S240). Further, UMTS RRC 28 sends "RAT Change Failure Indication" message to MM 32 (S242), and MM 32 forwards the "RAT Change Failure Indication" message to API 40 (S244). From that time, MM 32 is continuously provided with services from RR 18. Once API 40 receives the "RAT Change Failure Indication" message, it transmits every buffered packet through a UMTS stack. As a result, UMTS RRC 28 returns to a dedicated state (S246) while GSM RR 18 returns to a null state (S248).

Referring again to FIG. 4*b*, S158 that proceeds if UMTS RRC 28 fails to restore UMTS relevant physical layers at sub-step 236 of S154 is now explained as follows. At S158, UMTS RRC 28 tries to select a new UMTS cell again, and successfully reselects a new UMTS cell (S250), and then transmits a cell update message to the network for acquiring necessary resources for the call (S252).

In conclusion, the present invention has the following advantages:

First, although it is possible that a handover might degrade connection quality, GSM RR—UMTS RRC interface enables successful handovers between different RATs;

Second, it is now possible to perform the handover from GSM RR coverage to UMTS RRC coverage or vice versa more than once (actually several times) without disconnecting the call; and Third, if a handover to a new RAT fails with an existing call, the call returns to a previous RAT (a previously active RAT before performing the handover) without any problem.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for performing inter system handovers in a mobile telecommunication system, wherein a handover process is performed when a dual mode user equipment (UE), capable of communicating in both a GSM (Global System for Mobile communication)/GPRS (General Packet Radio Service) network and a UMTS (Universal Mobile Telecommunications System) network, connects a dedicated channel and sets up a call in a BSS (Base Station Subsystem) region where the GSM/GPRS provides coverage, and then moves to a UTRAN (UMTS Terrestrial Radio Access Network) where the UMTS provides coverage, the method comprising the steps of:

if the dual mode user equipment (UE) receives an inter system handover command, to handover from the BSS to the UTRAN, requesting, at a sublayer RR (Radio Resource) of GSM/GPRS network layer in the UE, a GSM/GPRS data link layer to suspend a GSM/GPRS data link, requesting a GSM/GPRS physical layer to release a physical channel of the GSM/GPRS, and sending the handover command between systems to the UTRAN for authorizing a sublayer RRC (Radio Resource Control) of UMTS network layer in the UE to continue calls;

requesting, at the RRC in the UE, a UMTS physical channel to be configured as a UMTS physical channel, and monitoring if the UMTS physical layer succeeds to configure the UMTS physical channel as requested;

if the UMTS physical layer succeeds to configure the UMTS physical channel, requesting, at the RRC in the UE, a UMTS data link layer to configure a UMTS data link, and conveying information to the UTRAN through a UMTS channel that the handover between systems from the BSS to the UTRAN has been successfully performed; and sending, at the RRC in the UE, a GSM/GPRS resource release message to RR/GRR of the UE, thereby resetting the GSM/GPRS physical layer and the GSM/GPRS data link layer.

2. The method as claimed in claim 1, further comprising the step of: before requesting the GSM/GPRS data link layer to suspend the GSM/GPRS data link, if the inter system handover to the UTRAN fails, storing, at the RR/GRR in the UE, a present dedicated channel configuration and cell allocation parameters in order to return to a previous dedicated channel configuration.

3. The method as claimed in claim 2, further comprising the steps of:

if the UMTS physical layer configuration fails, informing, at the UMTS RRC to the GSM RR/GRR in the UE, that the handover to the UTRAN is impossible; and requesting, at the RR/GRR, the GSM/GPRS physical layer to restore a GSM/GPRS physical layer configuration based on the previously stored dedicated channel configuration and cell allocation parameters.

4. The method as claimed in claim 3, further comprising the steps of:

monitoring, at the RR/GRR in the UE, if the GSM/GPRS physical channel succeeds to restore GSM/GPRS physical layer configuration; and if the GSM/GPRS physical layer configuration is successfully restored, requesting, at the RR/GRR in the UE, the GSM/GPRS data link layer to resume the GSM/GPRS data link that has been suspended, and informing the BSS through a previous GSM/GPRS channel that the inter system handover procedure to a UTRAN has failed.

5. The method as claimed in claim 4, further comprising the step of:

if the restoration of the GSM/GPRS physical layer configuration fails, informing, at the RR/GRR, CC (Call Control) through MM (Mobility Management)/GMM (GPRS MM) of network layer in the UE that a lower layer connection among dedicated connections has failed; and at a call reset request of the CC, resetting, at the RR/GRR, a call and returning to a dedicated state from an idle state.

6. The method as claimed in claim 4, further comprising the step of:

after informing, at the RR/GRR, the BSS through a previous GSM/GPRS channel that the inter system handover procedure from the UTRAN has failed, informing, at MM (Mobility Management)/GMM of network layer, an application layer API that the inter system (or RAT) change has been failed, whereby the API transmits a buffered voice packet through a GSM/GPRS stack.

7. The method as claimed in claim 1, further comprising the step of:

before sending an inter system handover command to the UTRAN for handing over control to a sublayer RRC (Radio Resource Control) of UMTS network layer in the UE, transmitting an indication of inter system (or RAT) change to MM (Mobility Management)/GMM of network layer and an application layer, for suspending voice application, whereby the application layer buffers voice packets.

8. The method as claimed in claim 7, further comprising the step of:

before informing the UTRAN through a UMTS channel that the inter system handover procedure to the UTRAN has been successfully completed, sending an indication of an inter system (or RAT) change completion to MM (Mobility Management)/GMM of network layer and an application layer to resume voice application that has been suspended, and sending, at the application layer, a buffered voice packet through a UMTS stack.

9. A method for performing inter system handovers in a mobile telecommunication system, wherein a handover is performed when a dual mode user equipment capable of communicating in both a GSM (Global System for Mobile communication)/GPRS (General Packet Radio Service) network and a UMTS (Universal Mobile Telecommunications System) network, connects a dedicated channel and carries out a communication in a UTRAN (UMTS Terrestrial Radio Access Network) where the UMTS provides coverage, and then moves to a BSS (Base Station Subsystem) region where the GSM/GPRS provides coverage, the method comprising the steps of:

if the dual mode user equipment (UE) receives an inter system handover command to handover from the UTRAN to the BSS, requesting, at a RRC (Radio Resource Control)/GRR (GPRS-RR) that is a sublayer of UMTS network layer in the UE, a UMTS data link layer to suspend a UMTS data link, requesting a UMTS physical layer to release a physical channel of the UMTS, and sending the handover command between systems from the UTRAN for authorizing a sublayer RR (Radio Resource) of GSM/GPRS network layer in the UE to continue calls;

requesting, at the RR/GRR in the UE, a GSM/GPRS physical channel to have a GSM/GPRS physical channel configuration, and monitoring if the GSM/GPRS physical layer succeeds to be configured as the GSM/GPRS physical channel as requested; and if the GSM/GPRS physical layer succeeds to configure the GSM/GPRS physical channel, requesting, at the RR/GRR in the UE, a GSM/GPRS data link layer to configure a GSM/GPRS data link, and conveying information to the BSS through a GSM/GPRS channel that the handover between systems from the UTRAN to the BSS has been successfully performed.

10. The method as claimed in claim 9, further comprising the step of:

before requesting the UMTS data link layer to suspend the UMTS data link, if the inter system handover procedure from the UTRAN fails, storing, at the RRC in the UE, a present dedicated channel configuration and cell allocation parameters in order to return to a previous dedicated channel configuration.

11. The method as claimed in claim 10, further comprising the steps of:

if the GSM/GRPS physical layer configuration fails, informing, at the GSM RR/GRR to the UMTS RRC in the UE, that the handover from the UTRAN is impossible; and requesting, at the RRC, the UMTS physical layer to have a UMTS physical layer configuration based on the previously stored dedicated channel configuration parameters.

12. The method as claimed in claim 11, further comprising the steps of:

monitoring, at the RRC in the UE, if the UMTS physical channel succeeds to restore UMTS physical layer configuration; and if the UMTS physical layer configuration is successfully restored, requesting, at the RRC in the UE, the UMTS data link layer to resume a UMTS data link that has been suspended, and informing the UTRAN through a previous UMTS channel that the inter system handover procedure from a UTRAN has failed.

13. The method as claimed in claim 12, further comprising the step of:

if the restoration of the UMTS physical layer configuration fails, selecting, at the RRC, a new UMTS cell again and transmitting a cell update message to network for obtaining necessary resources for a call.

14. The method as claimed in claim 12, further comprising the step of: after informing, at the RRC, the UTRAN through a previous UMTS channel that the inter system handover procedure from the UTRAN has failed, informing an application layer API through MM (Mobility Management)/GMM of network layer that the inter system (or RAT) change has failed, whereby the API transmits a buffered voice packet through a UMTS stack.

15. The method as claimed in claim 9, further comprising the step of:

before sending an inter system handover command from the UTRAN for handing over control to a sublayer RR (Radio Resource) of GSM/GPRS network layer in the UE, transmitting, at the RR, an indication of inter system (or RAT) change to an application layer API (Application Protocol Interface) through MM (Mobility Management)/GMM (GPRS-MM) of network layer, whereby the API buffers voice packets.

16. The method as claimed in claim 15, further comprising the step of:

before informing the BSS through a GSM/GPRS channel that the inter system handover procedure from the UTRAN has been successfully completed, sending an indication of an inter system (or RAT) change completion to the API through a MM (Mobility Management)/GMM of network layer to resume voice application that has been suspended, whereby the API sends a buffered voice packet through a GSM/GPRS stack.

* * * * *

UNITED STATES PATENT AND TRADEMARK OFFICE
CERTIFICATE OF CORRECTION

PATENT NO. : 6,963,745 B2  
DATED : November 8, 2005  
INVENTOR(S) : Amresh Singh et al.

It is certified that error appears in the above-identified patent and that said Letters Patent is hereby corrected as shown below:

<u>Title page,</u>  
Item [75], Inventors, "Arnresh Singh" should be -- Amresh Singh --.

Signed and Sealed this

Twenty-third Day of May, 2006

JON W. DUDAS  
*Director of the United States Patent and Trademark Office*